United States Patent
Zhang

(10) Patent No.: US 12,058,320 B2
(45) Date of Patent: Aug. 6, 2024

(54) IMAGE PROCESSING METHOD AND APPARATUS, TERMINAL, AND COMPUTER-READABLE STORAGE MEDIUM

(71) Applicant: TENCENT TECHNOLOGY (SHENZHEN) COMPANY LIMITED, Guangdong (CN)

(72) Inventor: Hong Shun Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 290 days.

(21) Appl. No.: 17/682,651

(22) Filed: Feb. 28, 2022

(65) Prior Publication Data
US 2022/0182615 A1   Jun. 9, 2022

Related U.S. Application Data

(63) Continuation of application No. PCT/CN2020/127690, filed on Nov. 10, 2020.

(30) Foreign Application Priority Data

Feb. 12, 2020 (CN) .................. 202010088822.5

(51) Int. Cl.
H04N 19/109 (2014.01)
H04N 19/132 (2014.01)
(Continued)

(52) U.S. Cl.
CPC ......... *H04N 19/109* (2014.11); *H04N 19/132* (2014.11); *H04N 19/147* (2014.11); *H04N 19/176* (2014.11)

(58) Field of Classification Search
CPC .. H04N 19/176; H04N 19/172; H04N 19/159; H04N 19/124; H04N 19/142;
(Continued)

(56) References Cited

U.S. PATENT DOCUMENTS

| | | | |
|---|---|---|---|
| 10,104,372 B2 | 10/2018 | Kondow | |
| 2005/0069211 A1* | 3/2005 | Lee | H04N 19/149 375/E7.157 |

(Continued)

FOREIGN PATENT DOCUMENTS

| | | |
|---|---|---|
| CN | 101969561 A | 2/2011 |
| CN | 104937936 A | 9/2015 |

(Continued)

OTHER PUBLICATIONS

Hollmann, Christopher et al. "CE6-Related: Transform Candidate Ordering" Joint Video Experts Team (JVET) of ITU-T SG 16 WP 3 and ISO/IEC JTC 1/SC 29/WG 11 14th Meeting: Geneva, CH, 19-27, JVET-N0491, Mar. 19- 27, 2019.

(Continued)

*Primary Examiner* — Nathnael Aynalem
(74) *Attorney, Agent, or Firm* — Sughrue Mion, PLLC

(57) ABSTRACT

An image processing method is provided. The image processing method includes determining an associated unit set of a current coding unit in an image frame, the associated unit set comprising associated coding units, the associated coding units including a target unit in the image frame adjacent to the current coding unit, and at least one coding unit in the image frame having a parent/child relationship with the current coding unit, determining first statistical information based on a prediction mode of each associated coding unit in the associated unit set, obtaining second statistical information of preprocessing image blocks corresponding to the current coding unit, and determining a coding prediction manner of the current coding unit based on the first statistical information and the second statistical information, the coding prediction manner indicating a selected prediction mode and/or a processing order of the prediction mode.

14 Claims, 7 Drawing Sheets

(51) Int. Cl.
H04N 19/147 (2014.01)
H04N 19/176 (2014.01)

(58) Field of Classification Search
CPC .. H04N 19/177; H04N 19/14; H04N 19/1883; H04N 19/105; H04N 19/114; H04N 19/146; H04N 19/192; H04N 19/31; H04N 19/96; H04N 19/103; H04N 19/107; H04N 19/109; H04N 19/11; H04N 19/132; H04N 19/136; H04N 19/139; H04N 19/147; H04N 19/179; H04N 19/196; H04N 19/463; H04N 19/577; H04N 19/50; H04N 19/503; H04N 19/567; H04N 19/154; H04N 19/149; H04N 19/15
USPC .......................................... 375/240–240.29
See application file for complete search history.

(56) References Cited

U.S. PATENT DOCUMENTS

| 2006/0133511 | A1 | 6/2006 | Chen et al. | |
|---|---|---|---|---|
| 2014/0219342 | A1* | 8/2014 | Yu | H04N 19/19 375/240.12 |
| 2014/0219349 | A1* | 8/2014 | Chien | H04N 19/105 375/240.12 |
| 2015/0304670 | A1 | 10/2015 | Liu et al. | |

FOREIGN PATENT DOCUMENTS

| CN | 108924551 A | 11/2018 |
|---|---|---|
| CN | 109788287 A | 5/2019 |
| CN | 111277824 A | 6/2020 |
| TW | 200623883 A | 7/2006 |

OTHER PUBLICATIONS

Chao, Yung-Hsuan et al., "Non-CE8: Implicit block partitioning in palette mode", Joint Video Experts Team (JVET) of ITU-T SG 16 WP 3 and ISO/IEC JTC 1/SC 29/WG 11, 16th Meeting: Geneva, CH, 1-11, JVET-P0473, Oct. 1-11, 2019.

International Search Report for PCT/CN2020/127690 dated Feb. 10, 2021.

Written Opinion for PCT/CN2020/127690 dated Feb. 10, 2021.

Extended European Search Report dated Oct. 27, 2022 in European Application No. 20918514.9.

Wenjun Zhao et al., "Hierarchical Structure-Based Fast Mode Decision for H.265/HEVC", IEEE Transactions on Circuits and Systems for Video Technology, 2015, vol. 25, No. 10, pp. 1651-1664 (14 pages total).

Translation of Written Opinion of the International Searching Authority dated Feb. 10, 2021 in International Application No. PCT/CN2020/127690.

\* cited by examiner

IMAGE PROCESSING METHOD AND APPARATUS, TERMINAL, AND COMPUTER-READABLE STORAGE MEDIUM

CROSS-REFERENCE TO RELATED APPLICATION(S)

This application is a continuation application of International Application No. PCT/CN2020/127690, filed on Nov. 10, 2020, which claims priority to Chinese Patent Application No. 202010088822.5, filed with the China National Intellectual Property Administration on Feb. 12, 2020, the entire contents of which are incorporated by reference herein.

FIELD

The disclosure relates generally to the field of image coding technologies, and in particular, to an image processing method and apparatus, a terminal, and a computer-readable storage medium.

BACKGROUND

With the development of video coding technologies, a variety of video coding standards have emerged. In the video coding standards, a plurality of prediction modes are usually provided. Currently, to determine the prediction mode adopted in the video coding process, it is necessary to calculate a rate-distortion cost in each prediction mode.

SUMMARY

Embodiments provide an image processing method and apparatus, a terminal, and a computer-readable storage medium that may adaptively and quickly determine the coding prediction manner of a coding unit.

In accordance with an aspect of an example embodiment of the disclosure, an image processing method may include determining an associated unit set of a current coding unit in an image frame, the associated unit set comprising associated coding units, the associated coding units including a target unit in the image frame adjacent to the current coding unit, and at least one coding unit in the image frame having a parent/child relationship with the current coding unit, determining first statistical information based on a prediction mode of each associated coding unit in the associated unit set, obtaining second statistical information of preprocessing image blocks corresponding to the current coding unit, determining a coding prediction manner of the current coding unit based on the first statistical information and the second statistical information, the coding prediction manner indicating a selected prediction mode and/or a processing order of the prediction mode, and performing prediction processing on the current coding unit based on the selected prediction mode and/or the processing order of the prediction mode.

In accordance with an aspect of an example embodiment of the disclosure, an apparatus may include at least one memory configured to store computer program code and at least one processor configured to access said computer program code and operate as instructed by said computer program code, said computer program code including first determining code configured to cause the at least one processor to determine an associated unit set of a current coding unit in an image frame, the associated unit set comprising associated coding units, the associated coding units including a target unit in the image frame adjacent to the current coding unit, and at least one coding unit in the image frame having a parent/child relationship with the current coding unit, second determining code configured to cause the at least one processor to determine first statistical information based on a prediction mode of each associated coding unit in the associated unit set, first obtaining code configured to cause the at least one processor to obtain second statistical information of preprocessing image blocks corresponding to the current coding unit, third determining code configured to cause the at least one processor to determine a coding prediction manner of the current coding unit based on the first statistical information and the second statistical information, the coding prediction manner indicating a selected prediction mode and/or a processing order of the prediction mode, and first performing code configured to cause the at least one processor to perform prediction processing on the current coding unit based on the selected prediction mode and/or the processing order of the prediction mode.

In accordance with an aspect of an example embodiment of the disclosure, a non-transitory computer-readable storage medium may store computer instructions that, when executed by at least one processor of a device, cause the at least one processor to determine an associated unit set of a current coding unit in an image frame, the associated unit set comprising associated coding units, the associated coding units including, a target unit in the image frame adjacent to the current coding unit, at least one coding unit in the image frame having a parent/child relationship with the current coding unit, determine first statistical information based on a prediction mode of each associated coding unit in the associated unit set, obtain second statistical information of preprocessing image blocks corresponding to the current coding unit, determine a coding prediction manner of the current coding unit based on the first statistical information and the second statistical information, the coding prediction manner indicating a selected prediction mode and/or a processing order of the prediction mode, and perform prediction processing on the current coding unit based on the selected prediction mode and/or the processing order of the prediction mode.

In accordance with an aspect of an example embodiment of the disclosure, an image processing apparatus may include:
  a processing unit, configured to determine an associated unit set of a current coding unit in an image frame, the associated unit set including associated coding units, the associated coding units including: a target unit in the image frame adjacent to the current coding unit, and at least one of coding units in the image frame having a parent/child relationship with the current coding unit;
  an obtaining unit, configured to determine first statistical information according to a prediction mode of each associated coding unit in the associated unit set;
  the obtaining unit being further configured to obtain second statistical information of preprocessing image blocks corresponding to the current coding unit; and
  the processing unit being further configured to determine a coding prediction manner of the current coding unit according to the first statistical information and the second statistical information, the coding prediction manner being used for indicating a selected prediction mode and/or a processing order of the prediction mode, to perform prediction coding on the current coding unit according to the selected prediction mode and/or the processing order of the prediction mode.

In accordance with an aspect of an example embodiment of the disclosure, provided is a terminal, including a processor and a memory, the memory being configured to store executable program code, and the processor being configured to invoke the executable program code, to perform the above image processing method.

In accordance with an aspect of an example embodiment of the disclosure, provided is a computer-readable storage medium, storing instructions, the instructions, when run on a computer, causing the computer to perform the above image processing method.

BRIEF DESCRIPTION OF THE DRAWINGS

In order to describe the technical solutions in the example embodiments of the disclosure more clearly, the following briefly describes the accompanying drawings for describing the example embodiments. Apparently, the accompanying drawings in the following description merely show some embodiments of the disclosure, and a person of ordinary skill in the art may still derive other accompanying drawings from these accompanying drawings without creative efforts.

DETAILED DESCRIPTION

The following clearly and completely describes the technical solutions in the embodiments of this disclosure with reference to the accompanying drawings in the embodiments of this disclosure. First, several terms used in the embodiments of this disclosure are briefly introduced.

An image frame may refer to a video including a plurality of image frames. Video compression coding generally adopts a block-based coding manner, that is, an image frame in a video is divided into a plurality of non-overlapping blocks, and then the blocks are coded. Each image frame may be coded in an inter prediction coding manner or an intra prediction coding manner during video coding.

In the high efficient video coding (HEVC) standards, the concepts of a coding unit, a predict unit and a transform unit are proposed. The coding unit (CU) is a basic unit for coding in an image frame. The coding unit may be a block having a pixel size of 64×64, 32×32, 16×16, 8×8, or the like. The predict unit (PU) is a basic unit for predicting in an image frame. The predict unit may be a block having a pixel size of 64×64, 64×32, 32×64, 32×32, 32×16, 16×32, 16×16, 16×8, 8×16, 8×8, 8×4, 4×8, 4×4, or the like. Transform unit (TU) is a basic unit for presenting a residual or transform coefficients in an image frame. The transform unit may also be a block having a pixel size of 32×32, 16×16, 8×8, 4×4, or the like.

A deblocking (DB) filter, a sample adaptive offset (SAO), a motion estimation (ME), and a rate-distortion cost (RD-cost) may be used for selecting the best among a plurality of options.

Video coding technologies are developing toward high-definition, high-frame rate, and high-compression rate. The currently popular video compression coding standards such as H.264 has certain limitations in the principle, and cannot meet the above requirements for video coding technologies. Therefore, HEVC standards are utilized.

Figure 1:
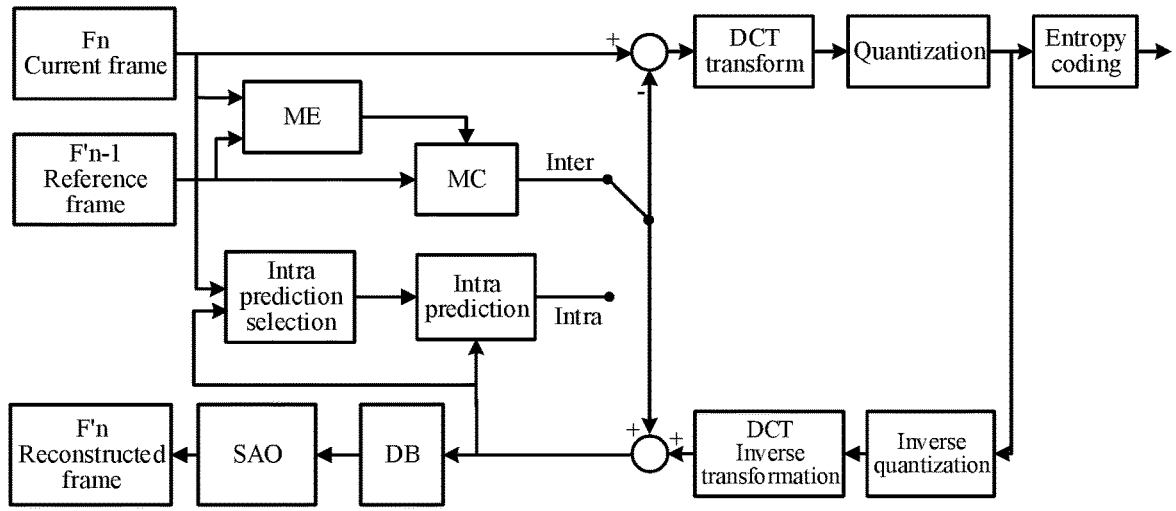
FIG. 1 is a diagram of a high efficient video coding (HEVC) coding framework according to an embodiment.

FIG. 1 is a diagram of a high efficient video coding (HEVC) coding framework according to an embodiment. FIG. 1 shows a standard HEVC coding frame. An image frame Fn is inputted to a coder, where the image frame Fn is first divided into a plurality of coding tree units (CTU) according to a certain size (for example, 64×64), and the CTUs are divided by depth to obtain a plurality of coding units, each coding unit including PUs and TUs. Then, prediction processing is performed on each PU to obtain a predicted value, the predicted value is subtracted from the input data to obtain a residual, the residual is subjected to discrete cosine transform (DCT) and quantization to obtain a residual coefficient, and then the residual coefficient is sent to an entropy coding module for processing to obtain a bitstream. At the same time, the residual coefficient is inversely quantized and inversely transformed to obtain a residual value of a reconstructed image frame, and then added with the predicted value to obtain a reconstructed image frame F'n. The reconstructed image frame F'n enters a reference frame queue after in-loop filtering, and is used as a reference image of a next image frame for sequential coding.

PU prediction is divided into intra prediction and inter prediction. First, an optimal partitioning mode is found by comparing different PUs within the same prediction type, and then an intra prediction mode and an inter prediction mode are compared to find an optimal prediction mode for a current CU; at the same time, an adaptive residual quad-tree transform (RQT) based on a quad-tree structure is performed on the CU to find an optimal TU mode; and finally, the image frame is divided into a plurality of CUs, and PUs and TUs corresponding to the CUs.

Figure 2:
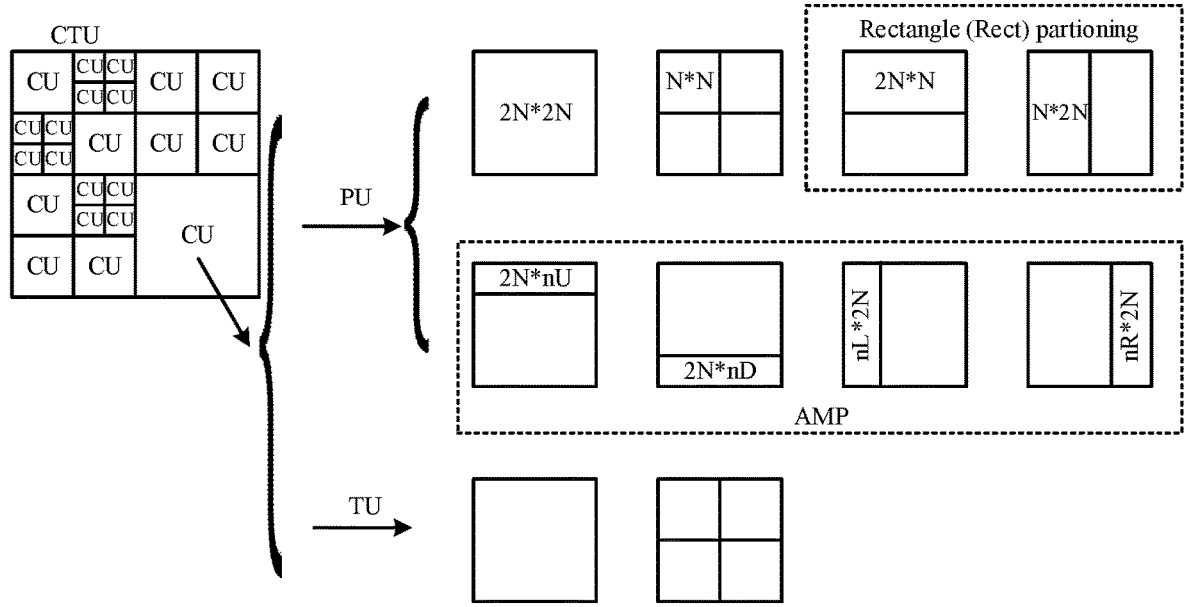
FIG. 2 is a diagram showing a partitioning manner corresponding to an inter prediction mode according to an embodiment.

FIG. 2 is a diagram showing a partitioning manner corresponding to an inter prediction mode according to an embodiment. FIG. 2 shows eight partitioning modes for the PU. There are 7 partitioning modes for inter prediction, which are 2N×2N mode, rectangle (Rect) partitioning mode and asymmetric motion partioning (AMP) mode. The Rect mode has 2 specific partioning modes, which are 2N×N and N×2N, respectively. The AMP mode has 4 partitioning modes, which are 2N×nU, 2N×nD, nL×2N and nR×2N, respectively. The above 7 partitioning modes correspond to 7 specific inter prediction modes, namely, an inter 2N×2N mode, an inter 2N×N mode, an inter N×2N mode, an inter 2N×nU mode, an inter 2N×nD mode, an inter nL×2N mode and an inter nR×2N mode. In addition to the above 7 inter prediction modes, the HEVC standards also provide 2 inter prediction modes: an inter skip mode and an inter merge mode. For the inter prediction, it is necessary to find the optimal one from the above nine inter prediction modes, that is, find the prediction mode with the lowest rate-distortion cost. An optimal result of the inter prediction is compared with an optimal result of the intra prediction to determine whether to select inter or intra prediction.

Figure 3:
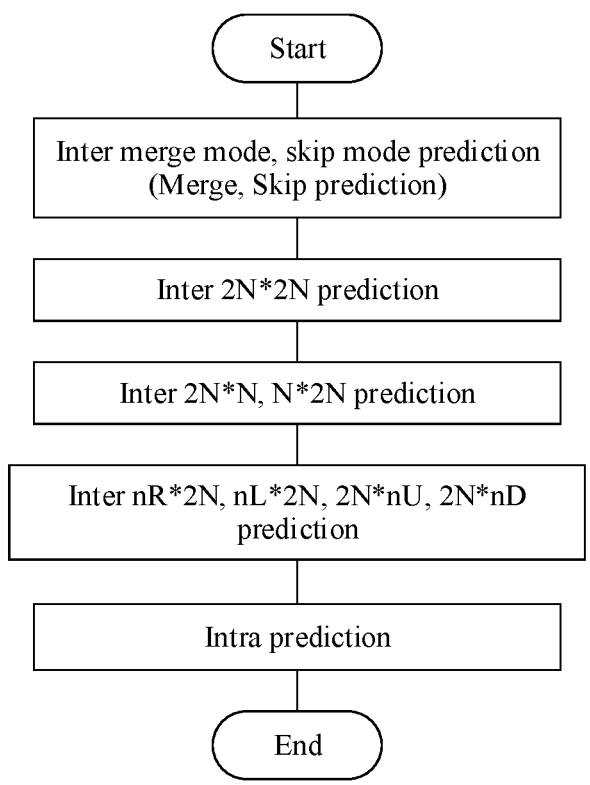
FIG. 3 is a flowchart of prediction according to an embodiment.

FIG. 3 is a flowchart of prediction according to an embodiment. In order to determine the final prediction mode to be adopted, it is necessary to calculate the rate-distortion cost under each prediction mode. However, the amount of calculation for calculating the rate-distortion cost is large, making the process of determining the prediction mode time-consuming and inefficient. Currently, the prediction is usually performed by first using various inter prediction modes and then using intra prediction modes according to the procedure shown in FIG. 3. The foregoing prediction process requires the use of all the prediction modes for prediction, which may lead to a large number of redundant calculations. For example, if it can be determined in advance that the optimal prediction mode after traversal calculation is more likely to be the intra prediction mode, then during prediction, only intra prediction is performed, and no inter prediction is performed, such that inter prediction may be avoided, thereby improving the efficiency of prediction processing. Based on this, the embodiments of this disclosure provide an image processing method that adaptively and quickly determines a coding prediction manner of a coding unit by using the number and an optimal prediction mode of adjacent units of the coding unit, the number and an optimal prediction mode of parent coding units having a parent/child relationship with the coding unit, and the number, an optimal prediction mode, and rate-distortion cost information of image blocks corresponding to the coding unit in the information obtained by image frame preprocessing. The coding prediction manner is used for indicating prediction modes to be selected and the processing order of the prediction modes, thus effectively improving the efficiency of determining the coding prediction manner. Detailed descriptions are provided below.

Figure 4:
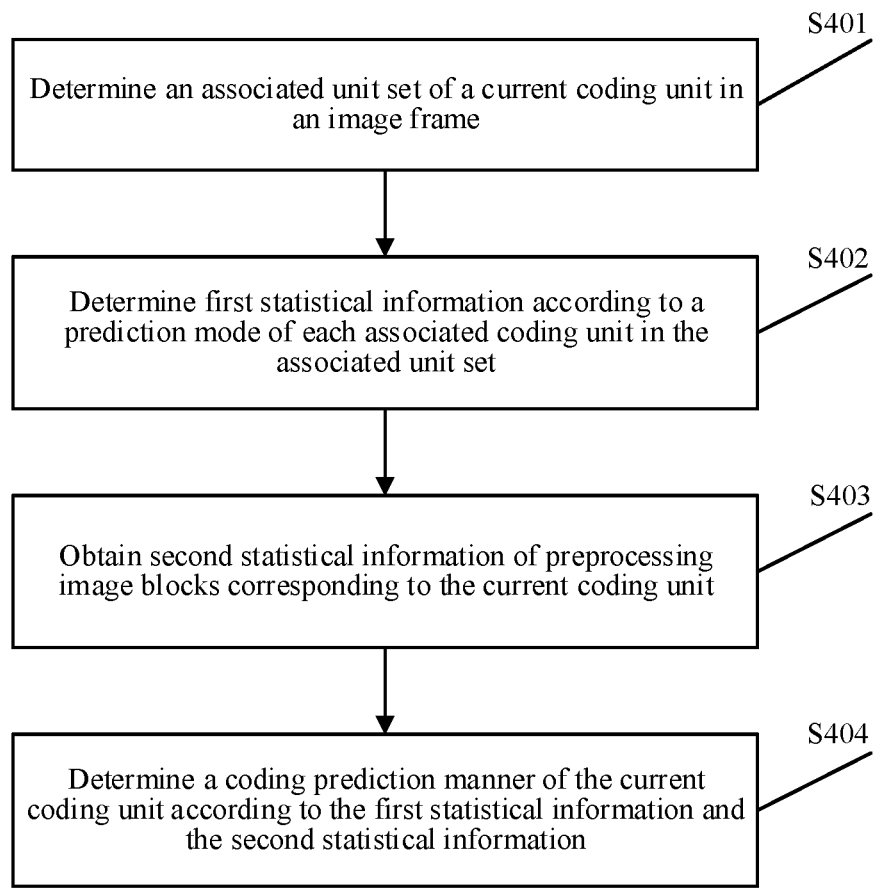
FIG. 4 is a flowchart of an image processing method according to an embodiment.

FIG. 4 is a flowchart of an image processing method according to an embodiment. The image processing method described in this embodiment may be applicable to a terminal having a video coding function, such as a computer, a video coder, a server, or the like. The method includes the following operations.

In operation S401, the system determines an associated unit set of a current coding unit in an image frame.

In the embodiments of this disclosure, the coding unit is any coding unit obtained by dividing the image frame into CTUs and then dividing by depth a CTU. The terminal determines the associated unit set of the current coding unit according to the position relationship and the division hierarchy relationship between the units obtained by dividing the image frame. The associated unit set includes associated coding units of the current coding unit, the associated coding units including: a target unit in the image frame adjacent to the current coding unit, and one or more of coding units in the image frame that have a parent/child relationship with the current coding unit.

In some embodiments, the target unit is an adjacent unit in the image frame that is adjacent to the current coding unit in a preset direction, where the preset direction may be one or more of left, upper left, top, or upper right. The target unit may be a predict unit or a coding unit in the image frame. Coding units having a parent/child relationship with the current coding unit include: coding units having a parent relationship with the current coding unit, that is, parent coding units to which the current coding unit belongs; or coding units having a child relationship with the current coding unit, that is, child coding units into which the current coding unit is divided.

In operation S402, the system determines first statistical information according to a prediction mode of each associated coding unit in the associated unit set.

In the embodiments of this disclosure, the terminal obtains a prediction mode of each associated coding unit in the associated unit set, the prediction mode including a first prediction mode or a second prediction mode; performs statistics on the number of the associated coding units for which the prediction mode is the first prediction mode in the associated unit set according to the obtained prediction mode of each associated coding unit; and determines the number of associated coding units for which the prediction mode is the first prediction mode in the associated unit set as the first statistical information. In some implementations, the first prediction mode is an intra prediction mode; the second prediction mode is an inter prediction mode.

In some other embodiments, the terminal obtains the total number of the associated coding units in the associated unit set and obtains prediction modes of each associated coding units in the associated unit set; performs statistics on the number of associated coding units for which the prediction mode is the first prediction mode in the associated unit set according to the obtained prediction mode of each associated coding unit; and determines the number of associated coding units for which the prediction mode is the first prediction mode in the associated unit set and the total number of the associated coding units in the associated unit sets as the first statistical information.

In some implementations, the total number of the associated coding units is a sum of the number of parent coding units of the coding units in the associated unit sets and the number of target units, or a sum of the number of child coding units of the coding units in the associated unit sets and the number of target units. The number of associated coding units for which the prediction mode is a first prediction mode is a sum of the number of target units for which the prediction mode is the first prediction mode and the number of parent coding units for which the prediction mode is the first prediction mode in the parent coding unit of the current coding unit, or is a sum of the number of target units for which the prediction mode is a the first prediction mode and the number of child coding units of the current coding unit for which the prediction mode is the first prediction mode.

Figure 5:
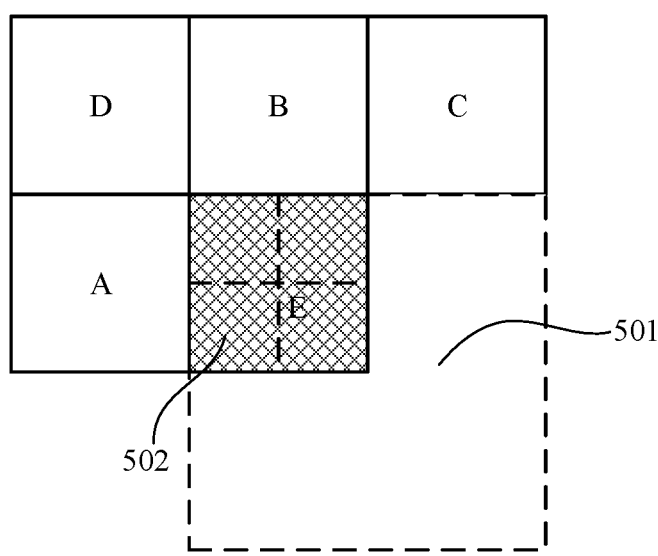
FIG. 5 is a diagram of a positional relationship between units according to an embodiment.

FIG. 5 is a diagram of a positional relationship between units according to an embodiment. For example, the first prediction mode is an intra prediction mode and the target unit is a predict unit. As shown in FIG. 5, E represents a coding unit, A, B, C, and D are PUs adjacent to the coding unit E, and optimal prediction modes of the predict units A, B, C, and D are already determined. 501 represents a parent coding unit of the coding unit E, and 502 represents a child coding unit of the coding unit E. In FIG. 5, the coding unit E is divided into four child coding units according to its center. The predict units A, B, C, and D and the parent coding unit or the child coding unit of the coding unit E are all associated coding units of the coding unit E. It is determined whether there is an adjacent predict unit of coding unit E at each of the positions A, B, C, and D; the number of adjacent predict units is recorded, which is denoted as nBlock1; and the number of the adjacent predict units for which the optimal prediction mode is an intra prediction mode is recorded, which is denoted as nIntra1. Only one of the parent coding unit or child coding unit of the coding unit E exists due to the coding order. To be specific, if the parent coding unit exists, the child coding unit does not exist; and if the child coding unit exists, the parent coding unit does not exist.

If the parent coding unit of the coding unit E exists and there is only one parent coding unit, the number nBlock1 is increased by 1 to obtain a total number nBlock of the associated coding units of the coding unit E. If the optimal prediction mode of the parent coding unit is the intra prediction mode, the number nIntra1 is increased by 1, which may mean that the number nIntra of the associated coding units of the coding unit E for which the prediction mode is an intra prediction mode is obtained.

If the child coding unit of coding unit E exists and the number of child coding units is 4, the number nBlock1 is increased by 4 to obtain a total number nBlock of the associated coding units of the coding unit E; and then whether the optimal prediction mode of each child coding unit is an intra prediction mode is determined one by one. If optimal prediction modes of all the four child coding units are intra prediction modes, the number nIntra1 is added by 4, which may mean that the number nIntra of the associated coding units of the coding unit E for which the prediction mode is an intra prediction mode is obtained.

In operation S403, the system obtains second statistical information of preprocessing image blocks corresponding to the current coding unit.

In the embodiments of this disclosure, the preprocessing image block corresponding to the current coding unit refers to an image block obtained by dividing the image area corresponding to the current coding unit in the image frame during the preprocessing of the image frame corresponding to the current coding unit. In some implementations, the terminal obtains the prediction mode of each preprocessing image block corresponding to the current coding unit, the prediction mode including a first prediction mode or a second prediction mode; performs statistics on the number of preprocessing image blocks for which the prediction mode is the first prediction mode among the preprocessing image blocks corresponding to the current coding unit according to the obtained prediction mode of each preprocessing image block; and determines the number of preprocessing image blocks for which the prediction mode is the first prediction mode as the second statistical information. The first prediction mode may be an intra prediction mode; and the second prediction mode may be an inter prediction mode.

In some other implementations, the terminal obtains the total number of the preprocessing image blocks corresponding to the current coding unit and obtains the prediction mode of each preprocessing image block; performs statistics on the number of the preprocessing image blocks for which the prediction mode is the first prediction mode among the preprocessing image blocks corresponding to the current coding unit according to the obtained prediction mode of each preprocessing image block; and determines the total number of the preprocessing image blocks and the number of the preprocessing image blocks for which the prediction mode is the first prediction mode as the second statistical information.

In some other implementations, the terminal obtains the total number of the preprocessing image blocks corresponding to the current coding unit and obtains the prediction mode and rate-distortion cost information of each preprocessing image block, the rate-distortion cost information including an intra rate-distortion cost and an inter rate-distortion cost, the intra rate-distortion cost being an optimal rate-distortion cost when the first prediction mode (or intra prediction mode) is used for the preprocessing image block, and the inter rate-distortion cost being an optimal rate-distortion cost when the second prediction mode (or inter prediction mode) is used for the preprocessing image block; determines the number of the preprocessing image blocks for which the prediction mode is the first prediction mode according to the prediction mode of each preprocessing image block; and accumulates the intra rate-distortion cost of each preprocessing image block to obtain the sum value of the intra rate-distortion costs, and accumulates the inter rate-distortion cost of each preprocessing image block to obtain the sum value of the inter rate-distortion costs. The terminal determines one or more of the total number of the preprocessing image blocks, the sum value of the intra rate-distortion costs, the sum value of the inter rate-distortion costs, and the number of the preprocessing image blocks for which the prediction mode is the first prediction mode as the second statistical information.

In the image frame coding process, there is usually a preprocessing process, such as a lookahead process in x265. The purpose is to determine a frame type, a guide code rate control, or the like, by analyzing a sequence in advance. x265 is an open source free software and function base used for a video that satisfies high efficiency video coding standards. Some information obtained from the preprocessing process may be used for guiding the later coding prediction process. During execution of the preprocessing process, intra prediction and inter prediction are performed on the image frames according to a fixed image block size, and then statistical information of the image blocks in the image area corresponding to the current coding unit, including a total number of the image blocks, a sum value of the intra rate-distortion costs, a sum value of the inter rate-distortion costs, a number of image blocks for which an optimal prediction mode is the first prediction mode, or the like, may be obtained, to provide a reference for determining the coding prediction manner of the current coding unit.

For example, by dividing the image frames with a size of 16×16 and performing the intra prediction and inter prediction for each 16×16 image block, the intra prediction optimal rate-distortion cost and inter prediction optimal rate-distortion cost may be obtained for each 16×16 image block. If the size of the current coding unit is 8×8 or 16×16, then there is only 1 image block in the image area corresponding to the current coding unit; if the size of the current coding unit is 32×32, then there are 4 image blocks in the image area corresponding to the current coding unit; and if the size of the current coding unit is 64×64, then there are 16 image blocks in the image area corresponding to the current coding unit. The total number of image blocks in the image area corresponding to the current coding unit is obtained, and is denoted as num; the sum value of the intra prediction optimal rate-distortion cost of the image blocks in the image area corresponding to the current coding unit is obtained, that is, the sum value of the intra rate-distortion costs, and is denoted as intracost; the sum value of the inter prediction optimal rate-distortion cost of the image blocks in the image area corresponding to the current coding unit, that is, the sum value of the inter rate-distortion costs, is obtained and is denoted as intercost; and the number of image blocks for which an optimal prediction mode is an intra prediction mode in the image blocks in the image area corresponding to the current coding unit is obtained and is denoted as intra_num.

In operation S404, the system determines a coding prediction manner of the current coding unit according to the first statistical information and the second statistical information.

In some embodiments, the first statistical information includes a number of associated coding units for which the prediction mode is a first prediction mode, and the second statistical information includes a number of preprocessing image blocks for which the prediction mode is the first prediction mode. The terminal detects whether the number of the associated coding units for which the prediction mode is the first prediction mode is greater than or equal to the first preset value, and detects whether the number of the preprocessing image blocks for which the prediction mode is the first prediction mode is greater than or equal to the second preset value; if the number of associated coding units for which the prediction mode is the first prediction mode is greater than or equal to the first preset value, and the number of the preprocessing image blocks for which the prediction mode is the first prediction mode is greater than or equal to the second preset value. The coding prediction manner of the current coding unit is determined using the second prediction mode to perform prediction processing on the current coding unit after using the first prediction mode to perform prediction processing on the current coding unit, or the coding prediction manner of the current coding unit is determined using the first prediction mode to perform prediction processing on the current coding unit.

In some other embodiments, the first statistical information includes a number of associated coding units for which the prediction mode is the first prediction mode and a total number of the associated coding units; and the second statistical information includes a number of preprocessing image blocks for which the prediction mode is the first prediction mode and a total number of the preprocessing image blocks. The terminal detects whether the number of associated coding units for which the prediction mode is the first prediction mode is greater than or equal to a first preset value, and detects whether the total number of the associated coding units is greater than or equal to a third preset value. If the number of associated coding units of the first prediction mode is greater than or equal to the first preset value and the total number of associated coding units is greater than or equal to the third preset value, whether the number of preprocessing image blocks for which the prediction mode is the first prediction mode is greater than or equal to the second preset value is further detected, and whether the total number of preprocessing image blocks is greater than or equal to the fourth preset value is further detected; if the number of preprocessing image blocks for which the prediction mode is the first prediction mode is greater than or equal to the second preset value, and the total number of the preprocessing image blocks is greater than or equal to the fourth preset value. The coding prediction manner of the current coding unit is determined using the second prediction mode to perform prediction processing on the current coding unit after using the first prediction mode to perform prediction processing on the current coding unit, or the coding prediction manner of the current coding unit is determined using the first prediction mode to perform prediction processing on the current coding unit.

In the above two manners, the coding prediction manner of the current coding unit may be determined adaptively according to the number of associated coding units for which the prediction mode is the first prediction mode in the associated coding units of the current coding unit, and the number of preprocessing image blocks for which the prediction mode is the first prediction mode in the preprocessing image blocks corresponding to the current coding unit. When the number of associated coding units for which the prediction mode is the first prediction mode and the number of preprocessing image blocks for which the prediction mode is the first prediction mode are both greater than the preset value, it may be determined that the optimal prediction mode of the current coding unit has a relatively high probability of being the first prediction mode. In this case, the first prediction mode may be directly determined as the prediction mode of the current coding unit, or it may be determined that the first prediction mode is advanced. Since the process of number statistics and the process of comparing the numbers involves a small amount of calculation and is less time-consuming, the above manner may be used to effectively improve the efficiency of determining the coding prediction manner on the basis of determining the coding prediction manner of the current coding unit relatively accurately.

Since the determining conditions of the above two manners are relatively simple, the accuracy of the determined coding prediction manner is low, and to improve the accuracy of the determined coding prediction manner, the following determining manner may be adopted. The first statistical information includes a number of associated coding units for which the prediction mode is a first prediction mode and a total number of the associated coding units; and the second statistical information includes a number of preprocessing image blocks for which the prediction mode is the first prediction mode, a total number of the preprocessing image blocks, a total sum value of the intra rate-distortion costs, and a total sum value of the inter rate-distortion costs.

In some implementations, whether the number of associated coding units for which the prediction mode is the first prediction mode, the total number of associated coding units, the number of preprocessing image blocks for which the prediction mode is the first prediction mode, the total number of preprocessing image blocks, the sum value of the intra rate-distortion costs, and the sum value of the inter rate-distortion costs satisfy the first preset condition is detected; if the first preset condition is satisfied, the first coding prediction manner is determined as the coding prediction manner of the current coding unit. The first coding prediction manner may include using a second prediction mode to perform prediction processing on the current coding unit after using a first prediction mode to perform prediction processing on the current coding unit.

Satisfying the first preset condition may mean that a difference between the number of the preprocessing image blocks for which the prediction mode is the first prediction mode and the total number of the preprocessing image blocks is less than or equal to a target value, the total number of the associated coding units is greater than or equal to a first value, the number of the associated coding unit for which the prediction mode is the first prediction mode is greater than or equal to a second value, and the sum value of intra rate-distortion costs is less than the value obtained by multiplying the sum value of the inter rate-distortion costs with a first reference value. The second value is determined according to the total number of associated coding units, for example, the second value is half of the total number of associated coding units. The first reference value is positively related to a coding speed and is a value greater than 0 and less than or equal to 1. For example, the target value is 0 and the first value is 2.

In some other implementations, whether the number of associated coding units for which the prediction mode is the first prediction mode, the total number of associated coding units, the number of preprocessing image blocks for which the prediction mode is the first prediction mode, the total number of the preprocessing image blocks, the sum value of the intra rate-distortion costs, and the sum value of the inter rate-distortion costs satisfy the first preset condition is detected. If the first preset condition is satisfied, it whether the number of associated coding units for which the prediction mode is the first prediction mode, the total number of associated coding units, the sum value of the intra rate-distortion costs and the sum value of the inter rate-distortion costs satisfy the second preset condition is further detected. If the second preset condition is satisfied, a second coding prediction manner is determined as the coding prediction manner of the current coding unit. If the second preset condition is not satisfied, the first coding prediction manner is determined as the coding prediction manner of the current coding unit. The second coding prediction manner includes using the first prediction mode to perform prediction processing on the current coding unit.

Satisfying the second preset condition may mean that a difference between the number of the associated coding units for which the prediction mode is the first prediction mode and the total number of the associated coding units is less than or equal to a target value, and the sum value of the intra rate-distortion costs is less than a value obtained by multiplying the sum value of the inter rate-distortion costs with a second reference value. The second reference value is positively related to the coding speed and is a value greater than 0 and less than or equal to 1, and is less than the first reference value. For example, the target value is 0. The target value in the second preset condition may be the same or different from the target value in the first preset condition. For the content meant by satisfying the first preset condition, reference may be made to the previous description and will not be repeated herein again.

For example, the first prediction mode is an intra prediction mode and the second prediction mode is an inter prediction mode. The total number of associated coding units in the associated unit set of the current coding unit is nBlock, the number of associated coding units for which the prediction mode is an intra prediction mode in the associated unit set is nIntra; the total number of preprocessing image blocks corresponding to the current coding unit is num, and the number of preprocessing image blocks for which the prediction mode is the intra prediction mode is intra_num. The sum value of the intra rate-distortion costs and the sum value of the inter rate-distortion costs of the preprocessing image blocks are intracost and intercost, respectively. The first reference value is thr1, and the second reference value is thr2.

Figure 6:
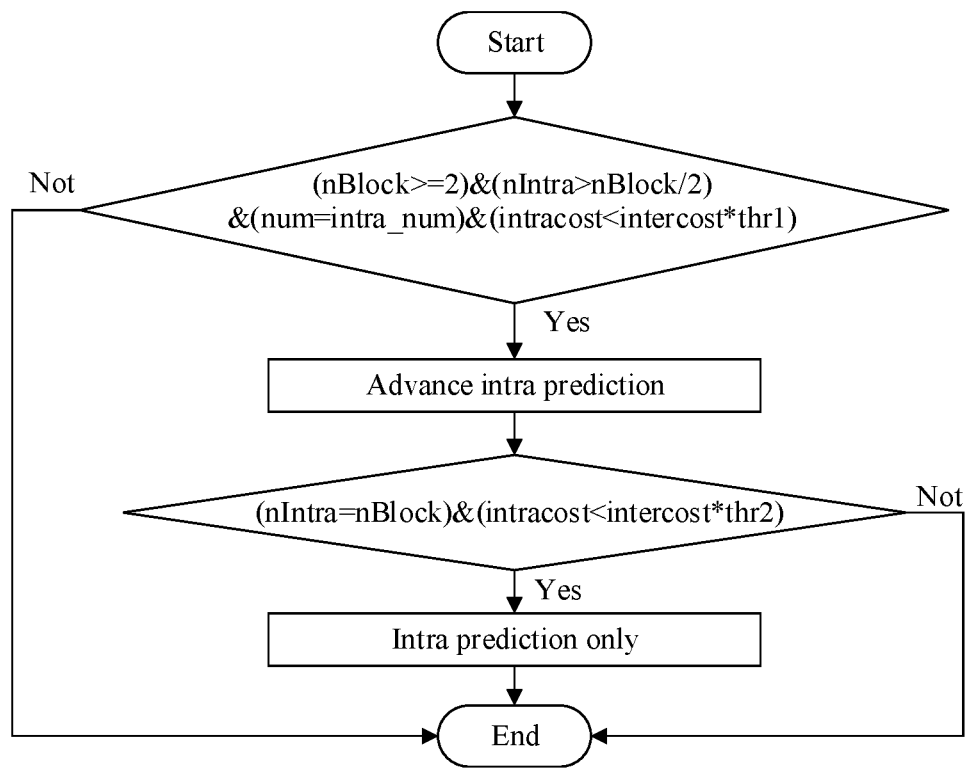
FIG. 6 is a flowchart of determining a coding prediction manner according to an embodiment.

FIG. 6 is a flowchart of determining a coding prediction manner according to an embodiment. As shown in FIG. 6, whether nBlock, nIntra, num, intra_num, intracost, and intercost satisfy the relationship shown in Equation (1) is determined, where Equation (1) is as follows:

$$(nBlock>=2)\&(nIntra>nBlock/2)\&(num=intra\_num)\&(ntracost<intercost\times thr1) \quad (1)$$

where & means "and". The value of the first reference value thr1 may range from 0.9 to 1. When the coding speed is relatively slow, the value of thr1 is 0.9, and as the coding speed becomes higher, thr1 also gradually increases. If Equation (1) is satisfied, it indicates that the prediction mode of each preprocessing image block corresponding to the current coding unit is the intra prediction mode, and the number of the associated coding units of the current coding unit is greater than or equal to 2, and the prediction modes of more than half of the associated coding units of the current coding unit is the intra prediction mode, and the sum value intracost of the intra rate-distortion costs of the preprocessing image block is less than the value obtained by multiplying the sum value intercost of the inter rate-distortion costs with the first reference value thr1, In this case, the optimal prediction mode of the current coding unit is more likely to be the intra prediction mode, and the intra prediction may be advanced, such that the coding prediction manner of the current coding unit is determined to include using the intra prediction mode to perform prediction processing on the current coding unit first, and then using the intra prediction mode to perform prediction processing on the current coding unit.

After determining to advance the intra prediction, whether nIntra, nBlock, intracost, and intercost satisfy the relationship shown in Equation (2) is further determined, where Equation (2) is as follows:

$$(nIntra=nBlock)\&(intracost<intercost\times thr2) \quad (2)$$

The second reference value thr2 is less than the first reference value thr1. The value of thr2 may range from 0 to 0.4. When the coding speed is relatively slow, the value of thr2 is 0, and as the coding speed becomes higher, thr2 also gradually increases. If Equation (2) is satisfied, it indicates that the prediction mode of each associated coding unit of the current coding unit is also the intra prediction mode and the sum value intracost of the intra rate-distortion costs of the preprocessing image blocks is less than the value obtained by multiplying the sum value intercost of the inter rate-distortion costs with the second reference value thr2. In this case, the optimal prediction mode of the current coding unit is most likely to be the intra prediction mode, and the intra prediction may be performed only, such that the coding prediction manner of the current coding unit is determined to include using the intra prediction mode only to perform prediction processing on the current coding unit.

In some other implementations, whether the number of associated coding units for which the prediction mode is the first prediction mode, the total number of associated coding units, the number of preprocessing image blocks for which the prediction mode is the first prediction mode, the total number of the preprocessing image blocks, the sum value of the intra rate-distortion costs, and the sum value of the inter rate-distortion costs satisfy the third preset condition is detected; and if the third preset condition is satisfied, a third coding prediction manner is determined as the coding prediction manner of the current coding unit. The third coding prediction manner includes using the second prediction mode to perform prediction processing on the current coding unit.

Satisfying the third preset condition may mean that the total number of the associated coding units is greater than or equal to a third value, the number of the associated coding units for which the prediction mode is the first prediction mode is less than or equal to a fourth value, the total number of the preprocessing image blocks is greater than or equal to a fifth value, and the number of preprocessing image blocks for which the prediction mode is the first prediction mode is less than or equal to a sixth value, and a sum value of inter rate-distortion costs is less than a value obtained by multiplying a sum value of intra rate-distortion costs with a third reference value. The third reference value is positively related to the coding speed and is a value greater than 0 and less than or equal to 1. For example, the third value is 2, the fifth value is 1, and the fourth value and the sixth value are 0.

Figure 7:
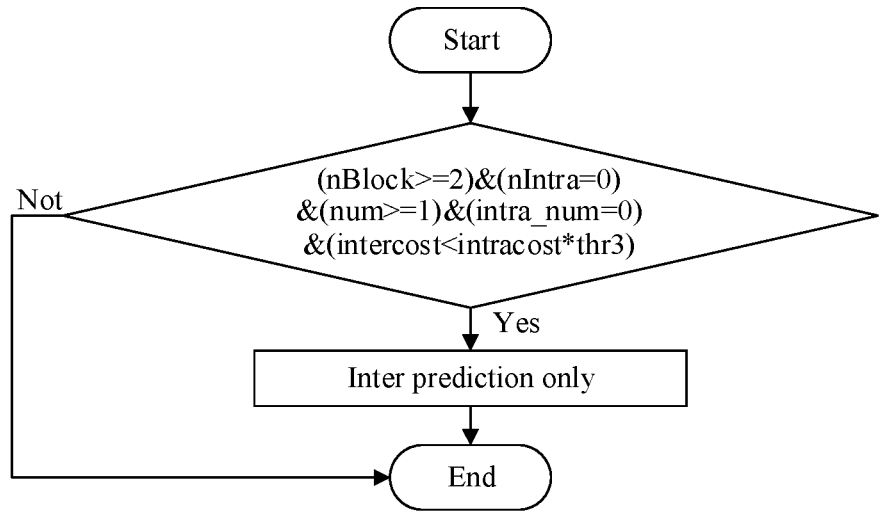
FIG. 7 is a flowchart of determining a coding prediction manner according to an embodiment.

FIG. 7 is a flowchart of determining a coding prediction manner according to an embodiment. For example, the third reference value is thr3. As shown in FIG. 7, whether nBlock, nIntra, num, intra_num, intracost, and intercost satisfy the relationship shown in Equation (3) is determined, where Equation (3) is as follows:

$$(n\text{Block}>=2)\&(n\text{Intra}=0)\&(\text{num}>=1)\&(\text{intra\_num}=0) \\ \&(\text{intercost}<\text{intracost}\times\text{thr3}) \quad (3)$$

The value of the third reference value thr3 may range from 0.4 to 1. When the coding speed is relatively slow, the value of thr3 is 0.4, and as the coding speed becomes higher, thr3 also gradually increases. If Equation (3) is satisfied, it indicates that the number of associated coding units of the current coding unit is greater than or equal to 2, and the optimal prediction modes of each associated coding unit is the inter prediction mode; and the current coding unit corresponds to at least one preprocessing image block, the optimal prediction mode of each preprocessing image block is the inter prediction mode, and the sum value intercost of the inter rate-distortion costs of the preprocessing image blocks is less than the value obtained by multiplying the sum value intracost of the intra rate-distortion costs with the third reference value thr3. In this case, the optimal prediction mode of the current coding unit is most likely to be the inter prediction mode, and the inter prediction may be performed only, such that the coding prediction manner of the current coding unit is determined to include using the inter prediction mode only to perform prediction processing on the current coding unit.

In the above three manners, the coding prediction manner of the current coding unit may be determined adaptively by detecting a preset condition satisfied by five parameters: the number of associated coding units for which the prediction mode is the first prediction mode, the total number of associated coding units, the number of preprocessing image blocks for which the prediction mode is the first prediction mode, the total number of the preprocessing image blocks, the sum value of the intra rate-distortion costs and the sum value of the inter rate-distortion costs. The determined accuracy of the coding prediction manner may be effectively improved on the basis of appropriately increasing the complexity of the determining conditions. The above detection process involves a small amount of calculation and less time-consuming, and the determining of the coding prediction manner is efficient.

In this embodiment, after determining the coding prediction manner of the coding unit, prediction processing is performed on the coding unit in accordance with the indication of the coding prediction manner. If the second coding prediction manner is selected, only the first prediction mode is used to perform prediction processing on the coding unit in the subsequent prediction processing, thus saving the step of using the second prediction mode to perform prediction processing on the coding unit, saving the time and the software and hardware resources consumed by the prediction processing, and accelerating the prediction processing. If the third coding prediction manner is selected, only the second prediction mode is used to perform prediction processing on the coding unit in the subsequent prediction processing, thus saving the step of using the first prediction mode to perform prediction processing on the coding unit, saving the time and the software and hardware resources consumed by the prediction processing, and accelerating of the prediction processing.

Figure 8:
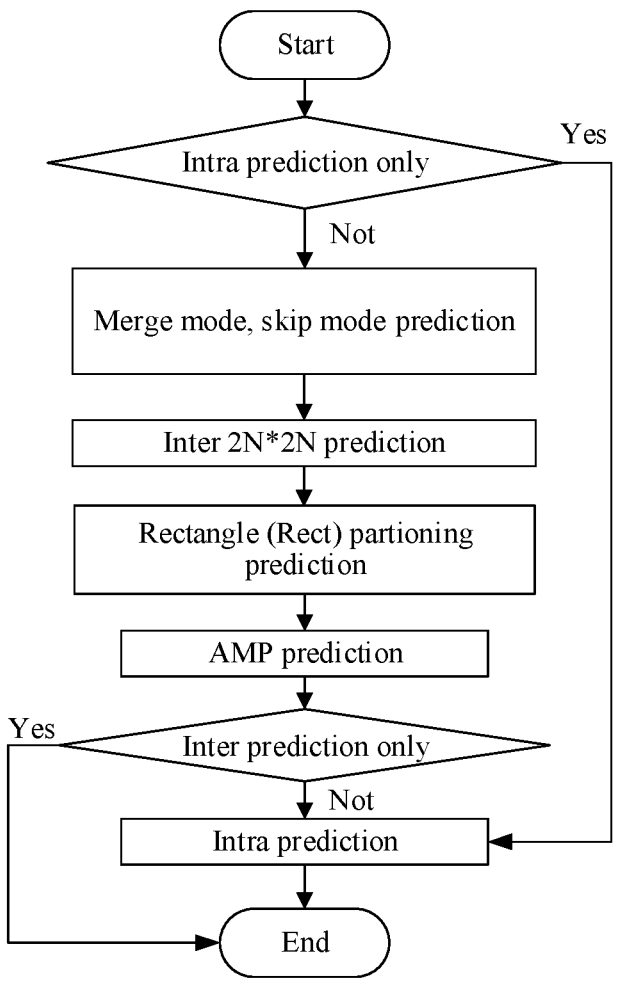
FIG. 8 is a diagram of prediction according to an embodiment.

FIG. 8 is a diagram of prediction according to an embodiment. For example, as shown in FIG. 8, if the selected coding prediction manner instructs to perform intra prediction only, then only the intra prediction is performed on the coding unit during the subsequent prediction processing. If the selected coding prediction manner instructs to perform inter prediction only, then during the subsequent prediction processing, merge and/or skip prediction processing, inter 2N×2N prediction processing, Rect prediction processing, and AMP prediction processing are sequentially performed on the coding unit to obtain the optimal inter prediction mode for the coding unit. The Rect prediction processing includes inter 2N×N prediction processing and inter N×2N prediction processing, and the AMP prediction processing includes inter 2N×nU prediction processing, inter 2N×nD prediction processing, inter nL×2N prediction processing, and inter nR×2N prediction processing. The inter 2N×2N prediction processing is using the inter 2N×2N mode to perform prediction processing, and the rest of the description is similar.

In some embodiments, if the first coding prediction manner is selected, during the subsequent prediction processing, the first prediction mode is first used to perform prediction processing on the coding unit, and the first rate-distortion cost of the coding unit when the first prediction mode is used is calculated. Then the second prediction mode of the target type is used to perform prediction processing on the coding unit, and the second rate-distortion of the coding unit when the second prediction mode of the target type is used is calculated. In some embodiments, the second prediction mode of the target type includes a merge prediction mode and/or a skip prediction mode. When the second prediction mode of the target type includes the merge prediction mode and the skip prediction mode, the second rate-distortion cost may be the minimum value of the inter rate-distortion cost of the coding unit when the merge prediction mode is used and the inter rate-distortion cost of the coding unit when the skip prediction mode is used.

Whether the first rate-distortion cost and the second rate-distortion cost satisfy the fourth preset condition is detected. In some implementations, satisfying the fourth preset condition mean that the first rate-distortion cost is less than the value obtained by multiplying the second rate-distortion cost with a fourth reference value. The fourth reference value is positively related to the coding speed and is a value greater than 0 and less than or equal to 1. If the fourth preset condition is satisfied, it indicates that the optimal prediction mode of the coding unit is most likely to be the first prediction mode. In this case, the first prediction mode may be determined as the optimal prediction mode of the coding unit, and the subsequent steps of performing prediction processing on the coding unit by using other types of second prediction modes may be ended, thus saving some of the steps of performing prediction processing on the coding unit by using the second prediction mode, saving the time and the software and hardware resources consumed by the prediction processing to a certain extent, and accelerating of the prediction processing.

Figure 9:
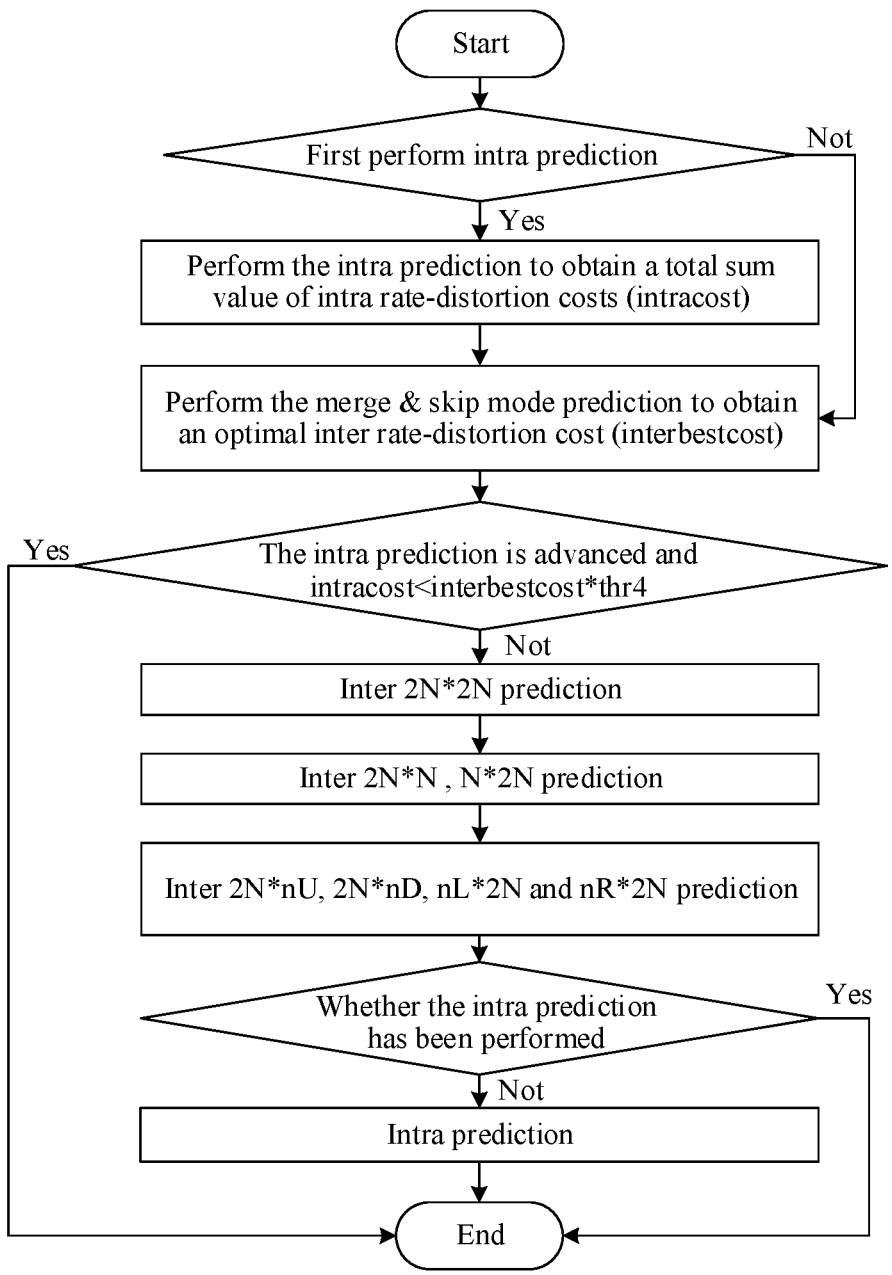
FIG. 9 is a diagram of prediction according to an embodiment.

FIG. 9 is a diagram of prediction according to an embodiment. For example, the fourth reference value is thr4. As shown in FIG. 9, when the coding prediction manner instructs to perform the intra prediction first, during the prediction processing, the intra prediction is performed on the coding unit first, and the optimal intra rate-distortion cost intrabestcost of the intra prediction is calculated. Then the merge prediction and the skip prediction in inter prediction is performed on the coding unit, and the optimal inter rate-distortion cost interbestcost of the merge prediction and the skip prediction is calculated. If the intrabestcost is less than the value obtained by multiplying the interbestcost with the fourth reference value thr4, it indicates that the optimal prediction mode of the coding unit is most likely to be the intra prediction mode. In this case, the intra prediction mode may be determined as the optimal prediction mode of the coding unit and the remaining inter prediction may be ended to skip some of the steps of the inter prediction, thus achieving prediction acceleration. If the intrabestcost is greater than or equal to the value obtained by multiplying the interbestcost with the fourth reference value thr4, the remaining inter prediction continues to be performed downward to obtain the optimal prediction mode for the coding unit.

The optimal prediction model is a prediction model with the lowest rate-distortion cost. The above examples are illustrated with the first prediction mode as the intra prediction mode and the second prediction mode as the inter prediction mode. The first prediction mode may also be an intra prediction mode; the second prediction mode may also be an inter prediction mode. In this case, the corresponding processing is similar.

According to this embodiment, first statistical information is determined according to prediction modes of units adjacent to and/or having a parent/child relationship with a coding unit, and second statistical information of preprocessing image blocks corresponding to the coding unit is obtained, and a coding prediction manner of the coding unit is determined according to the first statistical information and the second statistical information, such that the coding prediction manner of the coding unit may be determined adaptively and quickly, thereby improving the efficiency of determining the coding prediction manner.

Figure 10:
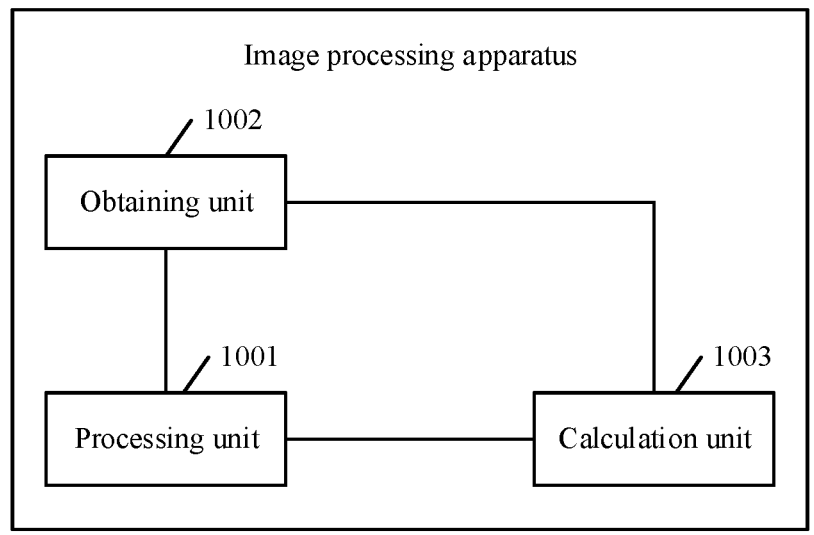
FIG. 10 is a diagram of an image processing apparatus according to an embodiment.

FIG. 10 is a diagram of an image processing apparatus according to an embodiment. The image processing apparatus described in this embodiment of this disclosure corresponds to the terminal described above. The apparatus includes the following components.

A processing unit 1001, configured to determine an associated unit set of a current coding unit in an image frame, the associated unit set including associated coding units, the associated coding units including a target unit in the image frame adjacent to the current coding unit, and at least one of coding units in the image frame having a parent/child relationship with the current coding unit.

An obtaining unit 1002, configured to determine first statistical information according to a prediction mode of each associated coding unit in the associated unit set.

The obtaining unit 1002 being further configured to obtain second statistical information of preprocessing image blocks corresponding to the current coding unit.

The processing unit 1001 being further configured to determine a coding prediction manner of the current coding unit according to the first statistical information and the second statistical information, the coding prediction manner being used for indicating a selected prediction mode and/or a processing order of the prediction mode, to perform prediction coding on the current coding unit according to the selected prediction mode and/or the processing order of the prediction mode.

In some embodiments, the first statistical information includes a number of associated coding units for which the prediction mode is a first prediction mode and a total number of the associated coding units and the second statistical information includes a total number of the preprocessing image blocks, a number of preprocessing image blocks for which the prediction mode is the first prediction mode, and rate-distortion cost information.

In some embodiments, the processing unit 1001 is further configured to determine the first coding prediction manner as the coding prediction manner of the current coding unit in a case that the first statistical information and the second statistical information satisfy a first preset condition and do not satisfy a second preset condition, the first coding prediction manner including using a second prediction mode to perform prediction processing on the current coding unit after using a first prediction mode to perform prediction processing on the current coding unit.

In some embodiments, the processing unit 1001 is further configured to after the determining the first coding prediction manner as the coding prediction manner of the current coding unit, calculate a first rate-distortion cost of the current coding unit in a case that the first prediction mode is used, and calculate a second rate-distortion cost of the current coding unit in a case that a second prediction mode of a target type is used, determine the first prediction mode as the prediction mode of the current coding unit in a case that the first rate-distortion cost and the second rate-distortion cost satisfy a fourth preset condition, and end an operation of using a second prediction mode of another type to perform prediction processing on the current coding unit.

In some embodiments, the processing unit 1001 is further configured to determine a second coding prediction manner as the coding prediction manner of the current coding unit in a case that the first statistical information and the second statistical information satisfy the first preset condition and the second preset condition, the second coding prediction manner including using a first prediction mode to perform prediction processing on the current coding unit.

In some embodiments, the processing unit 1001 is further configured to determine a third coding prediction manner as the coding prediction manner of the current coding unit in a case that the first statistical information and the second statistical information satisfy a third preset condition, the third coding prediction manner including using the second prediction mode to perform prediction processing on the current coding unit.

In some embodiments, the obtaining unit 1002 may be configured to obtain the total number of the associated coding units in the associated unit set, and obtain the prediction mode of each associated coding unit. The processing unit 1001 may be configured to determine the number of the associated coding units for which the prediction mode is the first prediction mode in the associated unit set according to the prediction mode of each associated coding unit, and determine the number of the associated coding units for which the prediction mode is the first prediction mode and the total number of the associated coding units as the first statistical information In some embodiments, the obtaining unit 1002 may be configured to obtain the total number of the preprocessing image blocks corresponding to the coding unit, and the prediction mode and rate-distortion cost information of each preprocessing image block.

The processing unit 1001 may be configured to determine the number of the preprocessing image blocks for which the prediction mode is the first prediction mode according to the prediction mode of each preprocessing image block, and determine the second statistical information according to the total number of the preprocessing image blocks, the number of the preprocessing image blocks for which the prediction mode is the first prediction mode, and the rate-distortion cost information.

In some embodiments, the rate-distortion cost information includes an intra rate-distortion cost and an inter rate-distortion cost, and the processing unit 1001 may be configured to determine a sum value of the intra rate-distortion costs and a sum value of the inter rate-distortion costs according to the rate-distortion cost information of each preprocessing image block, and determine the total number of the preprocessing image blocks, the number of the preprocessing image blocks for which the prediction mode is the first prediction mode, the sum value of the intra rate-distortion costs, and the sum value of the inter rate-distortion costs as the second statistical information.

In some embodiments, the total number of the associated coding units is a sum of the number of the target units and the number of parent coding units having a parent relationship with the current coding unit, or is a sum of the number of the target units and the number of child coding units having a child relationship with the current coding unit. The number of associated coding units for which the prediction mode is the first prediction mode is determined according to the number of the target units for which the prediction mode is the first prediction mode and the number of parent coding units for which the prediction mode is the first prediction mode in the coding units having a parent relationship with the current coding unit, or is determined according to the number of the target units for which the prediction mode is the first prediction mode and the number of child coding units for which the prediction mode is the first prediction mode in the coding units having a child relationship with the current coding unit.

In some embodiments, the processing unit 1001 may be configured to detect whether the number of associated coding units for which the prediction mode is the first prediction mode, the total number of the associated coding units, the number of preprocessing image blocks for which the prediction mode is the first prediction mode, the total number of the preprocessing image blocks, the sum value of the intra rate-distortion costs and the sum value of the inter rate-distortion costs satisfy a first preset condition, and if the first preset condition is satisfied, determine the first coding prediction manner as the coding prediction manner of the current coding unit, the first coding prediction manner including using a second prediction mode to perform prediction processing on the current coding unit after using a first prediction mode to perform prediction processing on the current coding unit.

In some embodiments, satisfying the first preset condition may mean that a difference between the number of the preprocessing image blocks for which the prediction mode is the first prediction mode and the total number of the preprocessing image blocks is less than or equal to a target value, the total number of the associated coding units is greater than or equal to a first value, the number of the associated coding unit for which the prediction mode is the first prediction mode is greater than or equal to a second value, and the sum value of intra rate-distortion costs is less than the value obtained by multiplying the sum value of inter rate-distortion costs with a first reference value; the second value is determined according to the total number of the associated coding units.

In some embodiments, the processing unit 1001 may be configured to detect whether the number of associated coding units for which the prediction mode is the first prediction mode, the total number of associated coding units, the number of the preprocessing image blocks for which the prediction mode is the first prediction mode, the total number of the preprocessing image blocks, the sum value of the intra rate-distortion costs, and the sum value of the inter rate-distortion costs satisfy the first preset condition. If the first preset condition is satisfied, the processing unit 1001 may detect whether the number of associated coding units for which the prediction mode is the first prediction mode, the total number of associated coding units, the sum value of intra rate-distortion costs and the sum value of inter rate-distortion costs satisfy the second preset condition; and if the second preset condition is satisfied, the processing unit 1001 may determine a second coding prediction manner as the coding prediction manner of the current coding unit, the second coding prediction manner including using the first prediction mode to perform prediction processing on the current coding unit.

In some embodiments, satisfying the second preset condition may mean that a difference between the number of the associated coding units for which the prediction mode is the first prediction mode and the total number of the associated coding units is less than or equal to the target value, and the sum value of the intra rate-distortion costs is less than a value obtained by multiplying the sum value of the inter rate-distortion costs with a second reference value.

In some embodiments, the processing unit 1001 may be configured to detect whether the number of associated coding units for which the prediction mode is the first prediction mode, the total number of the associated coding units, the number of preprocessing image blocks for which the prediction mode is the first prediction mode, the total number of the preprocessing image blocks, the sum value of the intra rate-distortion costs and the sum value of the inter rate-distortion costs satisfy the third preset condition, and if the third preset condition is satisfied, determine a third coding prediction manner as the coding prediction manner of the current coding unit, the third coding prediction manner including using the second prediction mode to perform prediction processing on the current coding unit.

In some embodiments, satisfying the third preset condition may mean that the total number of the associated coding units is greater than or equal to a third value, the number of the associated coding units for which the prediction mode is the first prediction mode is less than or equal to a fourth value, the total number of the preprocessing image blocks is greater than or equal to a fifth value, the number of the preprocessing image blocks for which the prediction mode is the first prediction mode is less than or equal to a sixth value, and a sum value of the inter rate-distortion costs is less than a value obtained by multiplying a sum value of the intra rate-distortion costs with a third reference value.

In some embodiments, the apparatus includes a calculation unit 1003. The calculation unit may be configured to calculate a first rate-distortion cost of the coding unit in a case that the first prediction mode is used, and calculate a second rate-distortion cost of the coding unit in a case that a second prediction mode of a target type is used.

The processing unit 1001 may be further configured to detect whether the first rate-distortion cost and the second rate-distortion cost satisfy a fourth preset condition, and if the fourth preset condition is satisfied, determine the first prediction mode as the prediction mode of the coding unit.

In some embodiments, the second prediction mode of the target type includes a merge prediction mode (a prediction mode provided in the HEVC standards) and/or a skip prediction mode (a prediction mode provided in the HEVC standards), and satisfying the fourth preset condition may mean that the first rate-distortion cost is less than a value obtained by multiplying the second rate-distortion cost with a fourth reference value.

It is to be understood that the functions of each function unit of the image processing apparatus of the embodiments of this disclosure may be specifically implemented according to the method in the above method embodiments, and for the specific implementation process, reference may be made to the relevant description of the above method embodiments, which will not be repeated herein.

According to this embodiment of this disclosure, first statistical information is determined according to prediction modes of units adjacent to and/or having a parent/child relationship with a coding unit, and second statistical information of preprocessing image blocks corresponding to the coding unit is obtained, and a coding prediction manner of the coding unit is determined according to the first statistical information and the second statistical information, such that the coding prediction manner of the coding unit may be determined adaptively and quickly, thereby improving the efficiency of determining the coding prediction manner.

Figure 11:
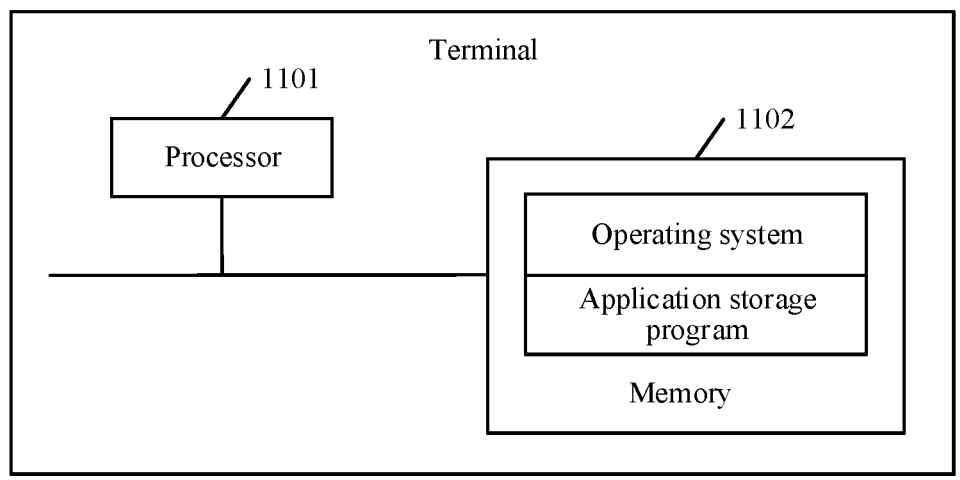
FIG. 11 is a diagram of a terminal according to an embodiment.

FIG. 11 is a diagram of a terminal according to an embodiment. The terminal provided in the embodiments of this disclosure includes a processor 1101 and a memory 1102. The processor 1101 and the memory 1102 may be connected in a bus or in other manners. In the embodiments of this disclosure, the bus connection is used as an example.

The processor 1101 may be a central processing unit (CPU). The processor 1101 may alternatively be a hardware chip. The foregoing hardware chip may be an application-specific integrated circuit (ASIC), a programmable logic device (PLD), or a combination thereof. The foregoing PLD may be a complex programmable logic device (CPLD), a field-programmable gate array (FPGA), a generic array logic (GAL), or any combination thereof.

The memory 1102 may mainly include a program storage area and a data storage area. The program storage area may store an operating system, a storage program required by at least one function (for example, a word storage function, a position storage function, and the like). The data storage area may store data (for example, image data and word data) created according to the adoption of the apparatus, and the like, and may include an application storage program. In addition, the memory 1102 may include a high speed random access memory, and may alternatively include a non-volatile memory, such as at least one magnetic disk storage device, a flash memory, or another volatile solid-state storage device.

The memory 1102 is further configured to store program instructions. The processor 1101 is configured to execute the program instructions stored in the memory 1102, and when the program instructions are executed, the processor 1101 is configured to determine an associated unit set of a current coding unit in an image frame, the associated unit set including associated coding units, the associated coding units including a target unit in the image frame adjacent to the current coding unit, and at least one of coding units in the image frame having a parent/child relationship with the current coding unit, determine first statistical information according to a prediction mode of each associated coding unit in the associated unit set; obtain second statistical information of preprocessing image blocks corresponding to the current coding unit, and determine a coding prediction manner of the current coding unit according to the first statistical information and the second statistical information, the coding prediction manner being adopted for indicating a selected prediction mode and/or a processing order of the prediction mode, to perform prediction coding on the current coding unit according to the selected prediction mode and/or the processing order of the prediction mode.

The methods performed by the processor in the embodiments of this disclosure are described from the perspective of the processor, and it is to be understood that the processor in the embodiments of this disclosure requires the cooperation of other hardware structures to perform the above methods. The embodiments of this disclosure do not describe in detail and limit the specific implementation process.

In some embodiments, the processor 1101, when determining first statistical information according to a prediction mode of each associated coding unit in the associated unit set, may be configured to obtain the total number of the associated coding units in the associated unit set, and obtain the prediction mode of each associated coding unit, determine the number of the associated coding units for which the prediction mode is the first prediction mode in the associated unit set according to the prediction mode of each associated coding unit; and determine the number of the associated coding units for which the prediction mode is the first prediction mode and the total number of the associated coding units as the first statistical information.

In some embodiments, the processor 1101, when obtaining second statistical information of preprocessing image blocks corresponding to the coding unit, may be configured to obtain the total number of the preprocessing image blocks corresponding to the coding unit, and obtains the prediction mode and rate-distortion cost information of each preprocessing image block, determine the number of the preprocessing image blocks for which the prediction mode is the first prediction mode according to the prediction mode of each preprocessing image block, and determine the second statistical information according to the total number of the preprocessing image blocks, the number of the preprocessing image blocks for which the prediction mode is the first prediction mode, and the rate-distortion cost information.

In some embodiments, the rate-distortion cost information includes an intra rate-distortion cost and an inter rate-distortion cost. The processor 1101, when determining the second statistical information according to the total number of the preprocessing image blocks, the number of the preprocessing image blocks for which the prediction mode is the first prediction mode, and the rate-distortion cost information, may be configured to determine a sum value of the intra rate-distortion costs and a sum value of the inter rate-distortion costs according to the rate-distortion cost information of each preprocessing image block, and determine the total number of the preprocessing image blocks, the number of the preprocessing image blocks for which the prediction mode is the first prediction mode, the sum value of the intra rate-distortion costs, and the sum value of the inter rate-distortion costs as the second statistical information.

In some embodiments, the total number of the associated coding units is a sum of the number of the target units and the number of coding units having a parent relationship with the current coding unit, or is a sum of the number of the target units and the number of coding units having a child relationship with the current coding unit. The number of associated coding units for which the prediction mode is the first prediction mode is determined according to the number of the target units for which the prediction mode is the first prediction mode and the number of units for which the prediction mode is the first prediction mode in coding units having a parent relationship with the current coding unit, or is determined according to the number of the target units for which the prediction mode is the first prediction mode and the number of coding units for which the prediction mode is the first prediction mode in the coding units having a child relationship with the current coding unit.

In some embodiments, when determining the coding prediction manner of the current coding unit according to the first statistical information and the second statistical information, the processor 1101 may be configured to detect whether the number of associated coding units for which the prediction mode is the first prediction mode, the total number of the associated coding units, the number of preprocessing image blocks for which the prediction mode is the first prediction mode, the total number of the preprocessing image blocks, the sum value of the intra rate-distortion costs and the sum value of the inter rate-distortion costs satisfy a first preset condition, and if the first preset condition is satisfied, determine the first coding prediction manner as the coding prediction manner of the current coding unit, the first coding prediction manner including using a second prediction mode to perform prediction processing on the current coding unit after using a first prediction mode to perform prediction processing on the current coding unit.

In some embodiments, satisfying the first preset condition may mean that a difference between the number of the preprocessing image blocks for which the prediction mode is the first prediction mode and the total number of the preprocessing image blocks is less than or equal to a target value, the total number of the associated coding units is greater than or equal to a first value, the number of the associated coding unit for which the prediction mode is the first prediction mode is greater than or equal to a second value, and the sum value of intra rate-distortion costs is less than the value obtained by multiplying the sum value of inter rate-distortion costs with a first reference value, the second value being determined according to the total number of the associated coding units.

In some embodiments, when determining the coding prediction manner of the current coding unit according to the first statistical information and the second statistical information, the processor 1101 may be configured to detect whether the number of the associated coding units for which the prediction mode is the first prediction mode, the total number of the associated coding units, the number of preprocessing image blocks for which the prediction mode is the first prediction mode, the total number of the preprocessing image blocks, the sum value of the intra rate-distortion costs, and the sum value of the inter rate-distortion costs satisfy the first preset condition. If the first preset condition is satisfied, the processor 1101 may be configured to detect whether the number of the associated coding units for which the prediction mode is the first prediction mode, the total number of the associated coding units, the sum value of the intra rate-distortion costs and the sum value of the inter rate-distortion costs satisfy the second preset condition. If the second preset condition is satisfied, the processor 1101 may be configured to determine a second coding prediction manner as the coding prediction manner of the current coding unit, the second coding prediction manner including using the first prediction mode to perform prediction processing on the current coding unit.

In some embodiments, satisfying the second preset condition may mean that a difference between the number of the associated coding units for which the prediction mode is the first prediction mode and the total number of the associated coding units is less than or equal to the target value, and the sum value of the intra rate-distortion costs is less than a value obtained by multiplying the sum value of the inter rate-distortion costs with a second reference value.

In some embodiments, when determining the coding prediction manner of the current coding unit according to the first statistical information and the second statistical information, the processor 1101 may be configured to detect whether the number of associated coding units for which the prediction mode is the first prediction mode, the total number of the associated coding units, the number of preprocessing image blocks for which the prediction mode is the first prediction mode, the total number of the preprocessing image blocks, the sum value of the intra rate-distortion costs and the sum value of the inter rate-distortion costs satisfy a third preset condition, and if the third preset condition is satisfied, determine a third coding prediction manner as the coding prediction manner of the current coding unit, the third coding prediction manner including using the second prediction mode to perform prediction processing on the current coding unit.

In some embodiments, satisfying the third preset condition may mean that the total number of the associated coding units is greater than or equal to a third value, the number of the associated coding units for which the prediction mode is the first prediction mode is less than or equal to a fourth value, the total number of the preprocessing image blocks is greater than or equal to a fifth value, the number of the preprocessing image blocks for which the prediction mode is the first prediction mode is less than or equal to a sixth value, and a sum value of inter rate-distortion costs is less than a value obtained by multiplying a sum value of intra rate-distortion costs with a third reference value.

In some embodiments, after the processor 1101 determines the first coding prediction manner as the coding prediction manner of the current coding unit, the processor 1101 is further configured to calculate a first rate-distortion cost of the current coding unit in a case that the first prediction mode is used, calculate a second rate-distortion cost of the current coding unit in a case that a second prediction mode of a target type is used, detect whether the first rate-distortion cost and the second rate-distortion cost satisfy a fourth preset condition; and if the fourth preset condition is satisfied, determine the first prediction mode as the prediction mode of the current coding unit.

In some embodiments, the second prediction mode of the target type includes a merge prediction mode and/or a skip prediction mode and satisfying the fourth preset condition may mean that the first rate-distortion cost is less than a value obtained by multiplying the second rate-distortion cost with a fourth reference value.

In a specific implementation, the processor 1101 and the memory 1102 described in this embodiment of this disclosure may perform the implementations of the terminal described in the image processing method provided in the above embodiments, and may also perform the implementation described in the image processing apparatus provided in the above embodiments, which is not be described herein again.

According to this embodiment of this disclosure, first statistical information is determined according to prediction modes of units adjacent to and/or having a parent/child relationship with a current coding unit, second statistical information of preprocessing image blocks corresponding to the current coding unit is obtained, and a coding prediction manner of the current coding unit is determined according to the first statistical information and the second statistical information, such that the coding prediction manner of the current coding unit may be determined adaptively and quickly, thereby improving the efficiency of determining the coding prediction manner.

The embodiments of this disclosure further provide a computer-readable storage medium, storing instructions, the instructions, when run on a computer, causing the computer to perform the image processing method according to the embodiments of this disclosure.

The embodiments of this disclosure further provide a computer program product including instructions, the instructions, when run on a computer, causing the computer to perform the image processing method according to embodiments of this disclosure.

For brief description, the foregoing method embodiments are stated as a series of action combinations. However, a person skilled in the art is to appreciate that this application is not limited to the described order of the actions, because according to this application, some steps may be performed in other orders or simultaneously. In addition, a person skilled in the art is further to learn that the embodiments described in the specification are some examples of this disclosure, and the related actions and modules are not necessarily mandatory to this application.

A person of ordinary skill in the art may understand that all or some of the steps of the methods in the foregoing embodiments may be implemented by a program instructing relevant hardware. The program may be stored in a computer-readable storage medium. The storage medium may include a flash disk, a read-only memory (ROM), a random access memory (RAM), a magnetic disk, an optical disk, and the like.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a CPU that performs the respective functions, a microprocessor, or the like. Two or more of these components may be combined into one single component which performs all operations or functions of the combined two or more components. Also, at least part of functions of at least one of these components may be performed by another of these components. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

The foregoing descriptions are merely example embodiments of this disclosure and are not intended to limit the protection scope of this disclosure. Any modification, equivalent replacement, or improvement made without departing from the spirit and range of this disclosure shall fall within the protection scope of this disclosure.

What is claimed is:

1. An image processing method, comprising:
   determining an associated unit set of a current coding unit in an image frame, the associated unit set comprising associated coding units, the associated coding units comprising:
      a target unit in the image frame adjacent to the current coding unit, and
      at least one coding unit in the image frame having a parent/child relationship with the current coding unit;
   determining first statistical information based on a prediction mode of each associated coding unit in the associated unit set;
   obtaining second statistical information of preprocessing image blocks corresponding to the current coding unit;
   determining a coding prediction manner of the current coding unit based on the first statistical information and the second statistical information, the coding prediction manner indicating a selected prediction mode and/or a processing order of the prediction mode; and
   performing prediction processing on the current coding unit based on the selected prediction mode and/or the processing order of the prediction mode,
   wherein the determining the coding prediction manner of the current coding unit based on the first statistical information and the second statistical information comprises:
   determining a first coding prediction manner as the coding prediction manner of the current coding unit based on the first statistical information and the second statistical information satisfying a first preset condition and not satisfying a second preset condition,
   wherein the first coding prediction manner comprises using a second prediction mode to perform prediction processing on the current coding unit after using a first prediction mode to perform prediction processing on the current coding unit,
   wherein the method further comprises:
      further comprising, after the determining the first coding prediction manner as the coding prediction manner of the current coding unit:
      calculating a first rate-distortion cost of the current coding unit based on the first prediction mode being used;
      calculating a second rate-distortion cost of the current coding unit based on the second prediction mode of a target type being used;
      determining the first prediction mode as the prediction mode of the current coding unit based on the first rate-distortion cost and the second rate-distortion cost satisfying a fourth preset condition; and
      ending an operation of using a second prediction mode of another type to perform prediction processing on the current coding unit, and
   wherein the second prediction mode of the target type comprises a merge prediction mode and/or a skip prediction mode, and
   wherein the fourth preset condition is satisfied by the first rate-distortion cost being less than a value obtained by multiplying the second rate-distortion cost with a fourth reference value.

2. The method of claim 1, wherein the determining the coding prediction manner of the current coding unit based on the first statistical information and the second statistical information comprises:

determining a second coding prediction manner as the coding prediction manner of the current coding unit based on the first statistical information and the second statistical information satisfying a first preset condition and a second preset condition, wherein the second coding prediction manner comprises using the first prediction mode to perform prediction processing on the current coding unit.

3. The method claim 2, wherein the first preset condition is satisfied based on a difference between a number of preprocessing image blocks for which the prediction mode is the first prediction mode and a total number of preprocessing image blocks being less than or equal to a target value, a total number of the associated coding units being greater than or equal to a first value, a number of the associated coding unit for which the prediction mode is the first prediction being is greater than or equal to a second value, and a sum value of intra rate-distortion costs being less than a value obtained by multiplying a sum value of inter rate-distortion costs with a first reference value, the second value being determined based on the total number of the associated coding units; and wherein the second preset condition is satisfied based on a difference between the number of the associated coding units for which the prediction mode is the first prediction mode and the total number of the associated coding units being less than or equal to the target value, and the sum value of intra rate-distortion costs being less than a value obtained by multiplying the sum value of inter rate-distortion costs with a second reference value.

4. The method of claim 1, further comprising:

determining a third coding prediction manner as the coding prediction manner of the current coding unit based on the first statistical information and the second statistical information satisfying a third preset condition, wherein the third coding prediction manner comprises using the second prediction mode to perform prediction processing on the current coding unit.

5. The method of claim 4, wherein the third preset condition is satisfied based on a total number of the associated coding units being greater than or equal to a third value, a number of the associated coding units for which the prediction mode is a first prediction mode being less than or equal to a fourth value, a total number of preprocessing image blocks being greater than or equal to a fifth value, a number of preprocessing image blocks for which the prediction mode is the first prediction mode being less than or equal to a sixth value, and a sum value of inter rate-distortion costs being less than a value obtained by multiplying a sum value of intra rate-distortion costs with a third reference value.

6. The method of claim 1, wherein the first statistical information comprises a number of associated coding units for which the prediction mode is a first prediction mode and a total number of the associated coding units; and wherein the second statistical information comprises a total number of preprocessing image blocks, a number of preprocessing image blocks for which the prediction mode is the first prediction mode, and rate-distortion cost information.

7. The method of claim 6, wherein the determining the first statistical information based on the prediction mode of each associated coding unit in the associated unit set comprises:

obtaining the total number of the associated coding units in the associated unit set;

obtaining the prediction mode of each associated coding unit; and determining the number of associated coding units for which the prediction mode is the first prediction mode in the associated unit set based on the prediction mode of each associated coding unit.

8. The method of claim 6, wherein the obtaining second statistical information of preprocessing image blocks corresponding to the current coding unit comprises:

obtaining a total number of preprocessing image blocks corresponding to the current coding unit;

obtaining the prediction mode and the rate-distortion cost information of each preprocessing image block;

determining the number of preprocessing image blocks for which the prediction mode is the first prediction mode based on the prediction mode of each preprocessing image block; and determining the second statistical information based on the total number of preprocessing image blocks.

9. The method of claim 8, wherein the rate-distortion cost information comprises an intra rate-distortion cost and an inter rate-distortion cost; and wherein the determining the second statistical information based on the total number of preprocessing image blocks, the number of preprocessing image blocks for which the prediction mode is the first prediction mode, and the rate-distortion cost information comprises:

determining a sum value of intra rate-distortion costs and a sum value of inter rate-distortion costs based on the rate-distortion cost information of each preprocessing image block; and determining the total number of preprocessing image blocks, the number of preprocessing image blocks for which the prediction mode is the first prediction mode, the sum value of intra rate-distortion costs, and the sum value of inter rate-distortion costs as the second statistical information.

10. An apparatus, comprising:

at least one memory configured to store computer program code; and at least one processor configured to access said computer program code and operate as instructed by said computer program code, said computer program code comprising:

first determining code configured to cause the at least one processor to determine an associated unit set of a current coding unit in an image frame, the associated unit set comprising associated coding units, the associated coding units comprising:

a target unit in the image frame adjacent to the current coding unit, and at least one coding unit in the image frame having a parent/child relationship with the current coding unit;

second determining code configured to cause the at least one processor to determine first statistical information based on a prediction mode of each associated coding unit in the associated unit set;

first obtaining code configured to cause the at least one processor to obtain second statistical information of preprocessing image blocks corresponding to the current coding unit;

third determining code configured to cause the at least one processor to determine a coding prediction manner of the current coding unit based on the first statistical information and the second statistical information, the coding prediction manner indicating a selected prediction mode and/or a processing order of the prediction mode; and first performing code configured to cause the at least one processor to perform prediction processing on the current coding unit based on the selected prediction mode and/or the processing order of the prediction mode, wherein the third determining code is further configured to cause the at least one processor to determining a first coding prediction manner as the coding prediction manner of the current coding unit based on the first statistical information and the second statistical information satisfying a first preset condition and not satisfying a second preset condition, wherein the first coding prediction manner comprises using a second prediction mode to perform prediction processing on the current coding unit after using a first prediction mode to perform prediction processing on the current coding unit, wherein the computer program code further comprises, after the determining the first coding prediction manner as the coding prediction manner of the current coding unit, first calculating code configured to cause the at least one processor to calculate a first rate-distortion cost of the current coding unit based on the first prediction mode being used;

second calculating code configured to cause the at least one processor to calculate a second rate-distortion cost of the current coding unit based on the second prediction mode of a target type being used;

fourth determining code configured to cause the at least one processor to determine the first prediction mode as the prediction mode of the current coding unit based on the first rate-distortion cost and the second rate-distortion cost satisfying a fourth preset condition; and first ending code configured to cause the at least one processor to end an operation of using a second prediction mode of another type to perform prediction processing on the current coding unit, and wherein the second prediction mode of the target type comprises a merge prediction mode and/or a skip prediction mode, and wherein the fourth preset condition is satisfied the first rate-distortion cost is less than a value obtained by multiplying the second rate-distortion cost with a fourth reference value.

11. The apparatus of claim 10, wherein the third determining code is further configured to cause the at least one processor to determine a second coding prediction manner as the coding prediction manner of the current coding unit based on the first statistical information and the second statistical information satisfying the first preset condition and the second preset condition;

wherein the second coding prediction manner comprises using the first prediction mode to perform prediction processing on the current coding unit.

12. The apparatus of claim 11, wherein the first preset condition is satisfied based on a difference between a number of preprocessing image blocks for which the prediction mode is the first prediction mode and a total number of preprocessing image blocks being less than or equal to a target value, a total number of the associated coding units being greater than or equal to a first value, a number of the associated coding unit for which the prediction mode is the first prediction mode being greater than or equal to a second value, and a sum value of intra rate-distortion costs being less than a value obtained by multiplying a sum value of inter rate-distortion costs with a first reference value, the second value being determined based on the total number of the associated coding units; and wherein the second preset condition is satisfied based on a difference between the number of the associated coding units for which the prediction mode is the first prediction mode and the total number of the associated coding units being less than or equal to the target value, and the sum value of intra rate-distortion costs being less than a value obtained by multiplying the sum value of inter rate-distortion costs with a second reference value.

13. The apparatus of claim 10, wherein the computer program code further comprises fifth determining code configured to cause the at least one processor to determine a third coding prediction manner as the coding prediction manner of the current coding unit based on the first statistical information and the second statistical information satisfying a third preset condition, wherein the third coding prediction manner comprises using a second prediction mode to perform prediction processing on the current coding unit.

14. A non-transitory computer-readable storage medium storing computer instructions that, when executed by at least one processor of a device, cause the at least one processor to:

determine an associated unit set of a current coding unit in an image frame, the associated unit set comprising associated coding units, the associated coding units comprising:
  a target unit in the image frame adjacent to the current coding unit, and
  at least one coding unit in the image frame having a parent/child relationship with the current coding unit;

determine first statistical information based on a prediction mode of each associated coding unit in the associated unit set;

obtain second statistical information of preprocessing image blocks corresponding to the current coding unit;

determine a coding prediction manner of the current coding unit based on the first statistical information and the second statistical information, the coding prediction manner indicating a selected prediction mode and/or a processing order of the prediction mode; and perform prediction processing on the current coding unit based on the selected prediction mode and/or the processing order of the prediction mode, wherein the determining the coding prediction manner of the current coding unit based on the first statistical information and the second statistical information comprises:

determining a first coding prediction manner as the coding prediction manner of the current coding unit based on the first statistical information and the second statistical information satisfying a first preset condition and not satisfying a second preset condition, wherein the first coding prediction manner comprises using a second prediction mode to perform prediction processing on the current coding unit after using a first prediction mode to perform prediction processing on the current coding unit, wherein the method further comprises:
further comprising, after the determining the first coding prediction manner as the coding prediction manner of the current coding unit:
calculating a first rate-distortion cost of the current coding unit based on the first prediction mode being used;
calculating a second rate-distortion cost of the current coding unit based on the second prediction mode of a target type being used;
determining the first prediction mode as the prediction mode of the current coding unit based on the first rate-distortion cost and the second rate-distortion cost satisfying a fourth preset condition; and
ending an operation of using a second prediction mode of another type to perform prediction processing on the current coding unit, and
wherein the second prediction mode of the target type comprises a merge prediction mode and/or a skip prediction mode, and
wherein the fourth preset condition is satisfied by the first rate-distortion cost being less than a value obtained by multiplying the second rate-distortion cost with a fourth reference value.

* * * * *